United States Patent [19]

Frutschi

[11] Patent Number: 5,758,485
[45] Date of Patent: Jun. 2, 1998

[54] METHOD OF OPERATING GAS TURBINE POWER PLANT WITH INTERCOOLER

[75] Inventor: Hans Ulrich Frutschi, Riniken, Switzerland

[73] Assignee: Asea Brown Boveri AG, Baden, Switzerland

[21] Appl. No.: 689,110

[22] Filed: Jul. 30, 1996

[30] Foreign Application Priority Data

Aug. 28, 1995 [DE] Germany .................. 195 31 562.6

[51] Int. Cl.[6] .................................................. F02C 7/143
[52] U.S. Cl. .................... 60/39.02; 60/728; 415/179
[58] Field of Search ...................... 60/39.02, 39.29, 60/728; 415/179

[56] References Cited

U.S. PATENT DOCUMENTS

| 4,362,462 | 12/1982 | Blotenberg | 415/179 |
|---|---|---|---|
| 4,709,547 | 12/1987 | Weiler | 60/39.29 |
| 5,347,806 | 9/1994 | Nakhamkin | 60/728 |
| 5,388,397 | 2/1995 | Frutschi . | |

FOREIGN PATENT DOCUMENTS

| 1428033 | 11/1968 | Germany | 415/179 |
|---|---|---|---|
| 3514718A1 | 10/1985 | Germany . | |
| 5-256166 | 10/1993 | Japan . | |
| WO93/06350 | 4/1993 | WIPO . | |

Primary Examiner—Louis J. Casaregola
Attorney, Agent, or Firm—Burns, Doane, Swecker & Mathis, L.L.P.

[57] ABSTRACT

In a method of operating a combined-cycle plant which is based on a gas-turbine group, the compressor unit of this same gas-turbine group is equipped with an intercooler (9). By detecting parameters which comprise at least the ambient temperature (T), the air humidity ($\phi$) of intake air (7) and the outlet pressure (Pic) of the intercooler (9), and by feeding the same to a computer (15), regulation is initiated by the latter, which regulation acts on members (17, 18) in the coolant circuit (13, 13a) between the intercooler (9) and a heat sink (14). The dew-point temperature of the cooled air (10), compressed to an intermediate pressure, downstream of the intercooler (9) is thereby influenced.

2 Claims, 2 Drawing Sheets

1

METHOD OF OPERATING GAS TURBINE POWER PLANT WITH INTERCOOLER

BACKGROUND OF THE INVENTION

1. Field of the Invention

The present invention relates to a method for operating an intercooled power plant to avoid condensation during intercooling.

2. Discussion of Background

When integrating an intercooler in the compressor unit of a power station plant based on a gas turbine, care is to be taken to ensure that no condensation of the air humidity occurs in the gas turbine. In particular during the use of axial compressors, the revaporization of the water contaminated by dust particles can cause adherent deposits on the blading of the compressor part arranged downstream of the intercooler, which deposits cause a reduction in output and efficiency in the course of the operating period. Depending on the nature of the residual dust quantity which has passed the intake filtering, cement-like layers may develop in particular on the guide blades, which layers can only be removed by opening the machine, which, apart from the losses of output and efficiency mentioned, also involves additional stoppage times.

A measure to remedy this, which has been disclosed, consists in keeping the recooling temperature at an increased temperature level of 45°–70° C. However, it should be taken into account here that, for the condensation of the air humidity, it is not the temperature and the pressure of the recooled air in the intercooler which are decisive but the lowest temperature of the corresponding cooling surface.

For weather conditions not bordering on the limits, such an overall measure constitutes a considerable loss of the output and efficiency potential of the intercooling.

SUMMARY OF THE INVENTION

Accordingly, one object of the invention, as defined in the claims, is to propose in a method of the type mentioned at the beginning measures which enable air condensation to be avoided during the intercooling within the air compression.

In order to be able to fully utilize the output and efficiency potential of the intercooling, the temperature of the cooling water or of another cooling medium at the inlet to the intercooler is regulated here to the level of the dew-point temperature at this point with reference to the outside temperature, the relative air humidity and, if need be, the ambient pressure as well as the air pressure at the outlet of the intercooler. The small temperature difference between cooling element and cooling water of 1°–3° C. at the colder end then represents precisely the required safety margin.

Advantageous and expedient further developments of the achievement of the object according to the invention are defined in the remaining claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
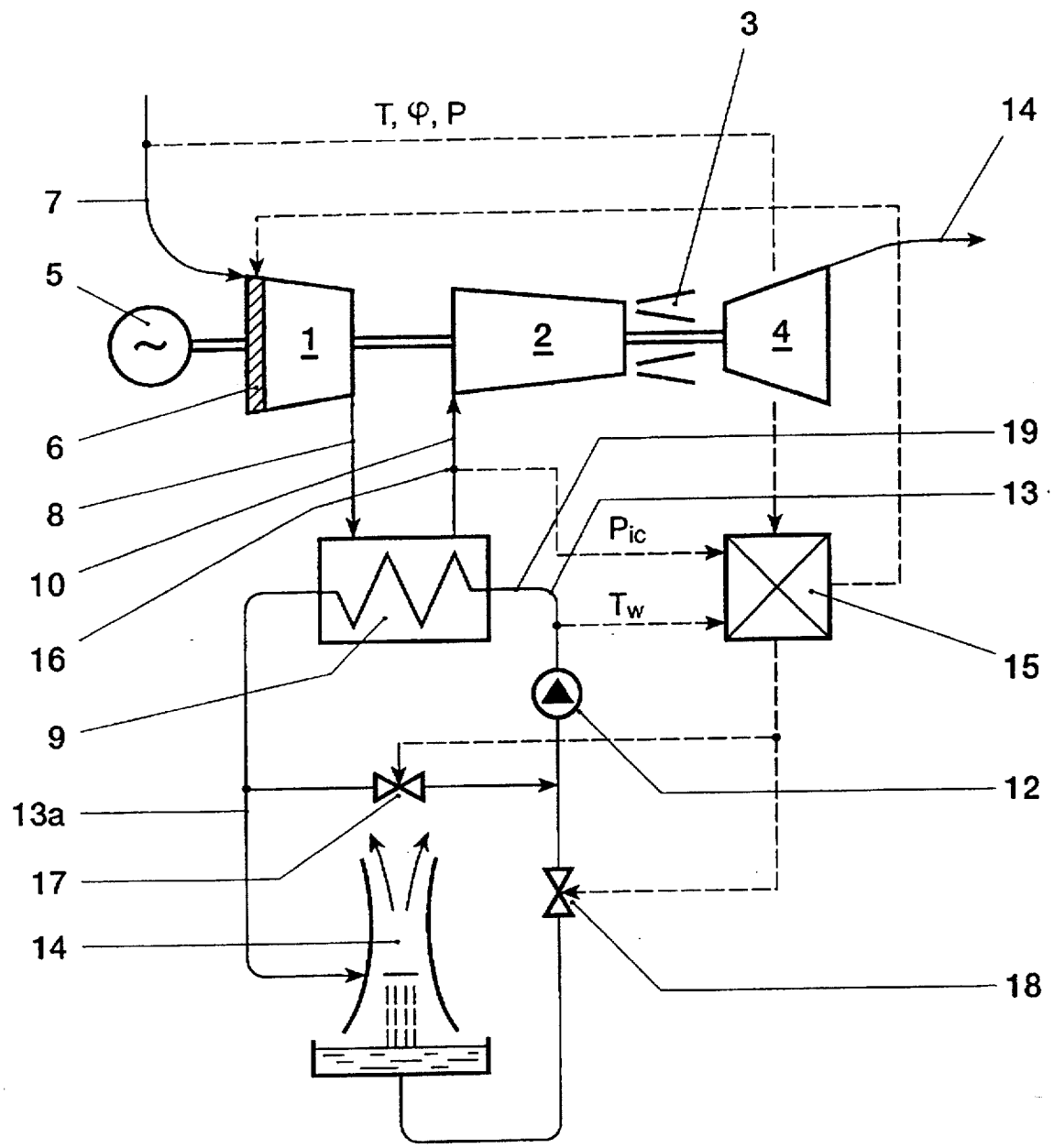
FIG. 1 shows a power station plant with temperature regulation of the cooling water.

Referring now to the drawings, wherein like reference numerals designate identical or corresponding parts throughout the several views, all elements not required for directly understanding the invention have been omitted, and the direction of flow of the media is indicated by arrows, FIG. 1 shows the arrangement of a power station plant in which the gas-turbine group is provided with temperature regulation of the coolant for the intercooling of the partially compressed air inside a compressor unit. Cooling water is taken as a basis for the coolant below. The power station plant itself consists of a low-pressure compressor 1, a high-pressure compressor 2 arranged downstream, a combustion chamber 3, a turbine 4 and a generator 5. On the inflow side, the low-pressure compressor 1 has at least one adjustable compressor guide row 6, the function of which will be explained in more detail further below in connection with the regulation of the coolant temperature. The intake air 7 is first of all compressed to an intermediate pressure in the low-pressure compressor 1, then this air 8 flows into an intercooler 9 in which it is correspondingly cooled before this air 10 is compressed to the final pressure in the high-pressure compressor 2 and is then directed into the combustion chamber 3. The hot gases produced in this combustion chamber 3 are then admitted to the downstream turbine 4 in order to continue to be used subsequently as exhaust gases 11 preferably in a waste-heat steam generator (not shown) for forming a steam quantity for operating a steam turbine. Cold or preheated cooling water 13 delivered by means of a pump 12 flows through the intercooler 9, preferably in counterflow to the throughflow direction of the compressed air 8. The cooling water 13 is heated in this intercooler 9 by heat exchange the heated cooling water 13a and is then diverted to a heat sink 14, which is shown here as a cooling tower. By detecting the ambient temperature T, the air humidity φ and the ambient pressure p as well as the outlet-air pressure Pic of the intercooler 9, and by feeding these signals to a computer 15 which also performs controller functions, the dew-point temperature of the air 10 cooled in the intercooler 9 is determined at a tapping point 16 downstream of the intercooler 9 and upstream of the high-pressure compressor 2, in which case, by means of a bypass 17 relative to the heat sink 14 between the flow of the cooling water 13 flowing there and the heated cooling water 13a, and when required by means of a further choke member 18 in the flow of the cooling water 13, now preheated by activation of the bypass 17, from the heat sink 14, the cooling-water temperature at a point 19 directly in front of the intercooler 9 is regulated according to the dew point temperature. Measuring the temperature Tw serves as feedback signal. Depending on the arrangement of the intercooler 9, in particular when there are especially effective draining devices, the temperature of the cooled air 10, compressed to an intermediate pressure, can be regulated to this value at the point 16 directly upstream of the high-pressure compressor 2. Depending on outside temperature T and existing temperatures at the points 19 or 16 already described, a certain, greatly varying outlet-air pressure Pic from the intercooler 9 is obtained. Under extreme conditions, the operating points of the two component compressors 1, 2 may thereby be adversely affected. In order to provide modulation here, the computer 15 can adjust at least one adjustable compressor guide row 6 in such a way that a favorable intermediate pressure of the precompressed air 8 after the corresponding compressor 1 arises, in which case this measure is only intended to take effect if it is absolutely necessary to influence the intermediate pressure for the purpose of avoiding the air condensation.

Figure 2:
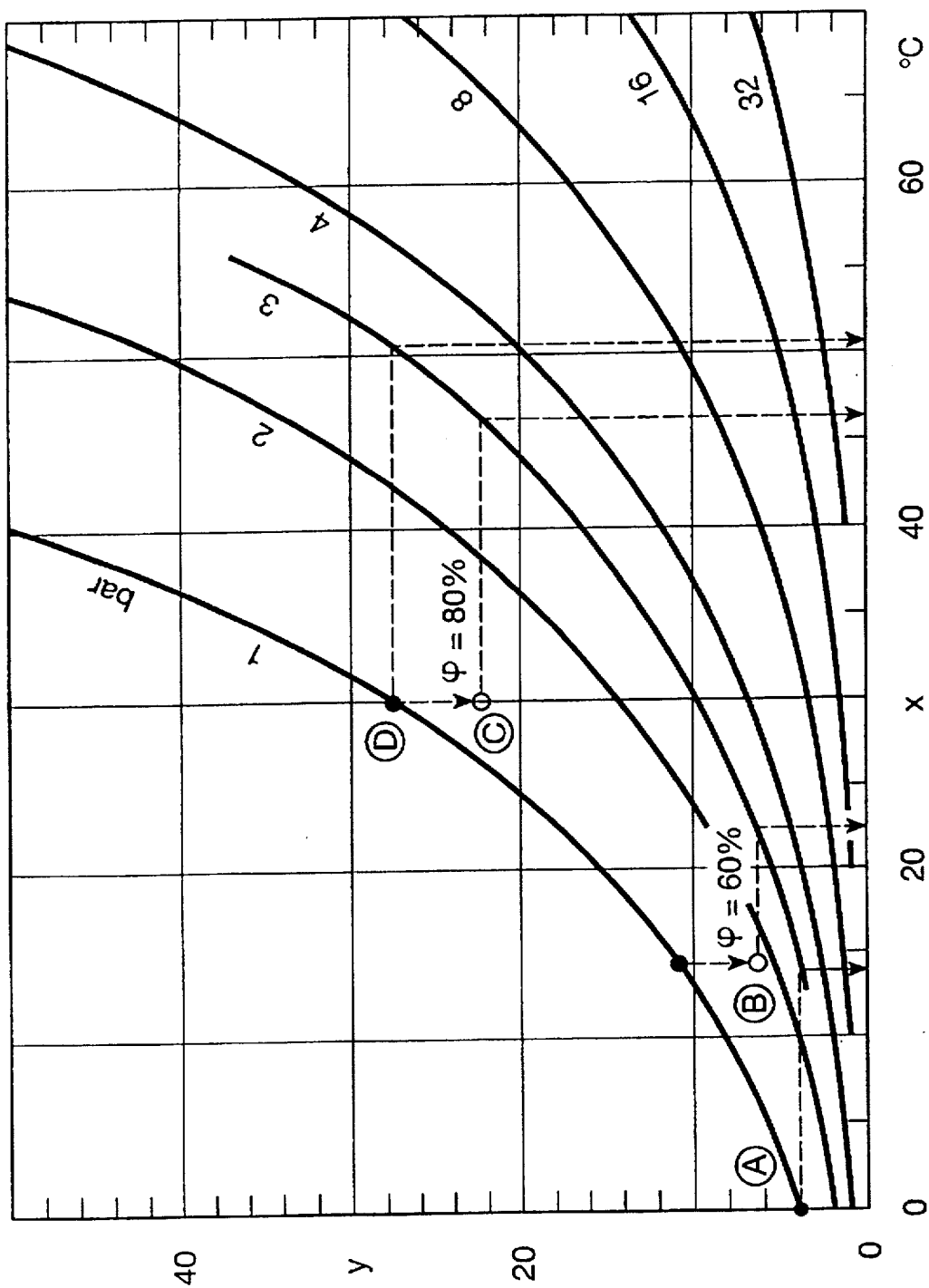
FIG. 2 shows saturation curves for water vapor in air at various compressor pressures.

FIG. 2 shows the absorptive capacity of water vapor in air (dew point). Curves of constant pressure for 100% relative humidity (dew lines) are plotted as a function of temperature (abscissa X) and the absolute humidity of the air in grams of water vapor per kilogram of air (ordinate Y). Four examples are intended to explain the relationship.

Example A

At 0° C. ambient temperature, 1 kg of air contains only about 4 g of water vapour even at maximum humidity of 100%. If the intercooler is put at 3 bar, the cooling-water temperature may be lowered to 14° C. before condensation occurs.

Example B

Under ISO conditions, i.e. at 15° C. and 60% relative air humidity, $\phi=60\%$, 1 kg of air contains 6.4 g of water vapor. In this case, the cooling-water temperature must not be below 22° C. at 3 bar.

Example C and D

At a high outside temperature of 300° C. and 80% air humidity, the cooling-water temperature must not be lowered below 46° C., and at 100% air humidity it must not be lowered below 51° C. At an intercooler pressure of 8 bar, for example, more than 70° C. would be necessary. The diagram according to FIG. 2 shows that an increase in the intercooler pressure also necessitates an increase in the cooling-water temperature, and vice versa.

Thus, in order to fully utilize the thermodynamic potential of the intercooling, as low an intermediate pressure as possible is to be selected.

In place of water, any other coolant, or heat-transfer medium, may also be used.

The compressor unit may also have a plurality of intercoolers, in which case each requires individual temperature regulation.

This method of preventing air condensation and revaporization during the compression involves a smaller pressure drop and less expense than is brought about by mechanical means, for example centrifugal-force separation or parallel-flow or counterflow connection of the cooling elements.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of a operating a power station plant having a low pressure compressor and a high pressure compressor and an intercooler connected in between for cooling air compressed in the low pressure compressor, the intercooler having a coolant circuit through which heated coolant flows to a heat sink and cooled coolant is returned to the intercooler, the plant also having at least one combustion chamber, at least one turbine and at least one generator, the method comprising the steps of:

monitoring values of at least ambient temperature, air humidity of intake air to the low pressure compressor, and outlet air pressure of the intercooler, determining from the monitored values a dew point temperature for the outlet air of the intercooler, directing a flow of heated coolant through a bypass upstream of the heat sink to mix into a flow of cooled coolant downstream of the heat sink; and controlling a flow of cooled coolant from the heat sink to the intercooler, wherein, a temperature of mixed coolant entering the intercooler is sufficiently high so that the outlet air of the intercooler is not cooled below the dew point.

2. The method as claimed in claim 1, further comprising the step of controlling an intake air flow into the low pressure compressor by adjusting an inlet guide vane row of the low pressure compressor.

* * * * *